United States Patent

[11] 3,610,342

| [72] | Inventor | Henry August Stainken<br>New York, N.Y. |
|---|---|---|
| [21] | Appl. No. | 886,159 |
| [22] | Filed | Dec. 18, 1969 |
| [45] | Patented | Oct. 5, 1971 |
| [73] | Assignee | Otis Elevator Company<br>New York, N.Y. |

[54] LOAD WEIGHING APPARATUS FOR ELEVATORS
20 Claims, 17 Drawing Figs.

[52] U.S. Cl. .................................................. 177/147,
187/1, 177/210, 177/245
[51] Int. Cl. ..................................................... B66c 1/40,
B66b 1/28, G01g 19/18
[50] Field of Search.... .............. ............ ..... 177/132,
147, 245, 210, 211; 187/1

[56] References Cited
UNITED STATES PATENTS

| 1,779,581 | 10/1930 | Behnke ........... ..... | 177/147 X |
| 2,142,579 | 1/1939 | Wehr... ................. ..... | 177/147 X |
| 2,411,023 | 11/1946 | Bruns ............... ...... | 177/132 |
| 3,173,508 | 3/1965 | Clamp........... ............ | 177/132 X |
| 3,290,931 | 12/1966 | Fowkes et al..... ... | 177/147 X |
| 3,323,606 | 6/1967 | Bruns et al................... | 177/147 |

FOREIGN PATENTS

| 924,276 | 4/1963 | Great Britain................ | 177/147 |

Primary Examiner—Robert S. Ward, Jr.
Attorneys—Joseph L. Sharon and Thomas W. Kennedy ABSTRACT: A load weighing apparatus including a hoist motor having a drive shaft for driving an elevator car having a variable load, a plurality of hoist ropes supported by the drive shaft and connected to a counterweight and to the elevator car at opposite ends thereof, and a brake applying and torque sensing device coupled to the drive shaft for measuring the amount of the elevator car variable load for operating a control for controlling the elevator car. The hoist motor and the brake applying and torque sensing device are mounted on a support structure. The brake applying and torque sensing device includes a pair of brake shoes for restraining the movement of the drive shaft and for resisting the torque applied to the drive shaft by the elevator car load In addition, the brake applying and torque sensing device includes tension bars for resisting the force of the shaft torque and includes transformer coils for measuring the amount of the torque force

PATENTED OCT 5 1971

INVENTOR
HENRY AUGUST STAINKEN
BY *Thomas W. Kennedy* ATTORNEY

INVENTOR
HENRY AUGUST STAINKEN
BY Thomas W. Kennedy ATTORNEY 3,610,342

LOAD WEIGHING APPARATUS FOR ELEVATORS

The present invention relates to load weighing apparatus for weighing the load of an elevator car of an elevator system, and particularly to a braking and load weighing apparatus for weighing the load of the elevator car and for simultaneously restraining the elevator car against movement.

A conventional elevator system includes an elevator car, a plurality of hoist ropes for supporting the elevator car, a hoist motor for driving and supporting the hoist ropes, control means for controlling the hoist motor, and load weighing apparatus cooperating with the control means for measuring the amount of live load in the elevator car.

One type of conventional load weighing apparatus includes an elevator car support framework, an elevator car platform resting on said framework and supporting a platform live load, resilient support means disposed between the platform and the support framework to permit a slight displacement of the platform relative to the framework corresponding to a change in the amount of live load, and sensing means operative to sense the relative displacement of the platform for measuring the amount of live load on the platform. The above-described type of conventional load weighing apparatus is shown and described in U.S. Pat. No. 2,761,038, to W. H. Bruns et al., issued Aug. 28, 1956, which is assigned to the same assignee as in this application. The above-described type of conventional load weighing apparatus requires conductors between the car and the machine room for the car operation. Another requirement of such apparatus is that the underside of the elevator car must be accessible in order to repair and to service the load weighing apparatus.

A second type of conventional load weighing apparatus includes an elevator car, a counterweight, hoist ropes having portions connecting to the elevator car and counterweight, a bedplate fixedly connected to the hoist motor, a support structure for supporting the bedplate, and pivotal mounting means interconnecting the bedplate and the support structure, wherein the pivotal mounting means is arranged so that the live load in the elevator car causes a rotary displacement of the bedplate relative to the support structure about a pivot axis disposed substantially midway between the car hoist rope portion and the counterweight hoist rope portion. The apparatus also includes means interconnecting the bedplate and the support structure for limiting the amount of such rotary displacement, and includes sensing means operative to sense the amount of such rotary displacement thereby measuring the live load in the car. The above-described second type of conventional load weighing apparatus is shown and described in U.S. Pat. No. 3,323,606, to W. H. Bruns et al., issued June 6, 1967, which is assigned to the same assignee as in this application. The above-described second type of conventional load weighing apparatus requires a special type of pivotal mounting for supporting the relatively heavy vertical load of the bedplate and requires special fasteners for resisting the transverse load on the bedplate.

In accordance with one embodiment of the present invention, the above-described requirements of the two types of conventional load weighing apparatus are avoided by using the following new apparatus. The new load weighing apparatus includes a support structure, a hoist motor mounted thereon and having a drive shaft with a drive sheave, hoist ropes connected to the sheave and connected to the car, a brake disc mounted on the shaft, and a brakeshoe which resists the force of the torque on the brake disc for supporting the elevator car in a stationary position. The apparatus also includes a load weighing sensor connected to the support structure and connected to the brakeshoe, wherein the sensor is operative to sense and measure the amount of the brake disc torque force thereby measuring the amount of the live load in the elevator car.

Accordingly, it is one object of the present invention to provide a load weighing apparatus for an elevator car of an elevator system for measuring the load of the elevator car.

It is another object of the invention to provide a load weighing apparatus according to the aforementioned object including a hoist motor barking and load weighing unit for simultaneously restraining the elevator car against movement and for measuring the load of the elevator car.

It is another object of the invention to provide a load weighing apparatus including a braking and load weighing unit according to the aforementioned objects, wherein the unit can coact with a hoist motor brake disc and can use structural members to not only resist the torque on the hoist motor but also to sense the amount of such torque in order to measure the live load in the elevator car.

It is a further object of the invention to provide a load weighing apparatus including a hoist motor braking and load weighing unit according to the aforementioned objects, wherein the apparatus can be made of a plurality of modular braking and load weighing units, which can be made substantially identical in construction, which can be adapted for simultaneous actuation, which can be peripherally spaced about the brake disc for coaction therewith, and which can be adapted to provide a common output signal.

According to the present invention, there is provided a load weighing apparatus comprising, an elevator car having a variable load, a counterweight for said elevator car, a hoist rope connected to said elevator car and to said counterweight, a hoist motor for said hoist rope, a support structure supporting said hoist motor, said hoist motor having a drive shaft for driving said hoist rope and for resisting the torque applied thereto by said hoist rope, brake applying means cooperating with said drive shaft and operative to resist the torque applied to said drive shaft, and torque sensing means connected to said brake applying means and to said support structure and operative to sense and to measure said shaft torque for measuring the elevator car variable load.

Other objects of the invention will become apparent upon reading the following description and accompanying drawings, wherein like parts are designated by like numerals throughout the several views, and wherein.

13 is a curve of voltage (V) versus load (L).

Figure 1:
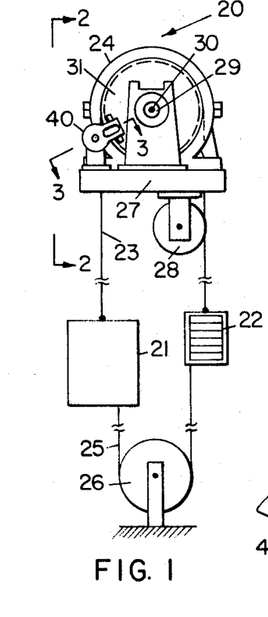
FIG. 1 is a schematic elevation view of an elevator system having a load weighing apparatus embodying features of the present invention.
Figure 2:
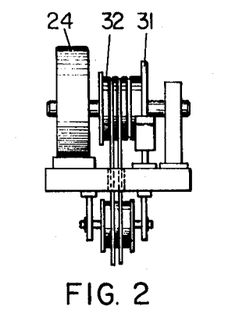
FIG. 2 is a sectional view taken along the line 2—2 of FIG. 1.

Referring to FIG. 1, one embodiment of the present invention is an elevator system 20. Elevator system 20 includes an elevator car 21, a counterweight 22, a plurality of hoist ropes 23 and a hoist motor 24. Car 21 and counterweight 22 are interconnected by hoist ropes 23, which are supported and driven by hoist motor 24.

Car 21 and counterweight 22 also have a plurality of compensating ropes 25 and a tensioning sheave unit 26 of conventional construction. Compensating ropes 25 are connected at opposite ends thereof to car 21 and counterweight 22. Compensating ropes 25 minimize the variation in torque on hoist motor 24 caused by the shifting of the weight of the hoist ropes 23 due to changes in the vertical position of car 21.

Hoist motor 24 is supported by a machine room platform or bedplate or support structure 27, which has a secondary sheave 28 for guiding hoist ropes 23. Hoist motor 24 has a drive shaft 29, which has a shaft axis 30. Shaft 29 has a brake disc 31 and a drive sheave 32. Drive sheave 32 supports hoist ropes 23 for supporting and driving car 21 and counterweight 22. Hoist motor 24 also has a braking and load weighing apparatus or unit 40, which is operative to apply a braking torque on brake disc 31 to hold car 21 in a stationary position, and which is also operative to sense the force of the torque in brake disc 31 caused by the live load in car 21 while car 21 is in such stationary position.

Figure 3:
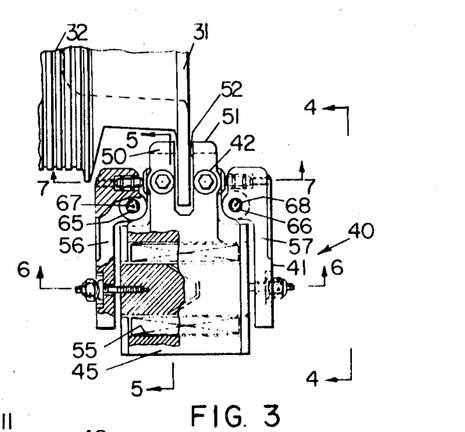
FIG. 3 is a sectional view taken along the line 3—3 of FIG. 1.
Figure 4:
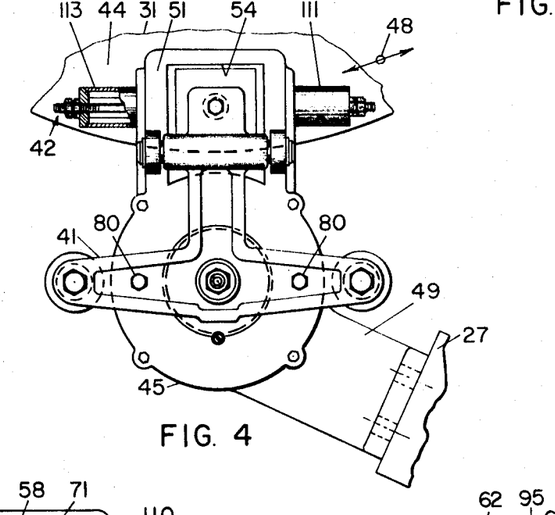
FIG. 4 is a sectional view taken along the line 4—4 of FIG. 3.
Figure 5:
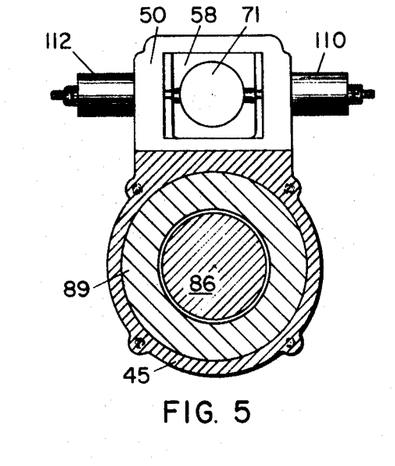
FIG. 5 is a sectional view taken along the line 5—5 of FIG. 3.
Figure 7:
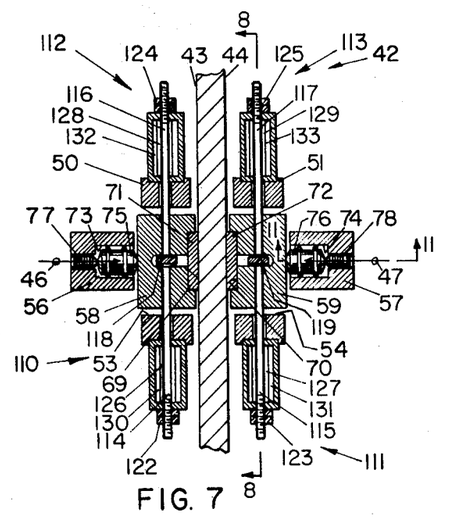
FIG. 7 is a sectional view taken along the line 7—7 of FIG. 3.

Braking and load weighing unit 40 (FIGS. 3, 4), which is a unitary structure or single assembly, includes a brake applying means 41, which is operative to grip disc 31, and a load weighing or torque force sensing means 42, which is connected to said brake applying means 41 and which is operative to weigh the live load in car 21 by sensing the force of the torque on disc 31. Disc 31 (FIG. 7) has friction surfaces 43, 44 on the opposite sides thereof, which are engaged by brake applying means 41. Sheave 32 is fixedly connected to shaft 29 coaxially therewith along shaft axis 31. Disc 31 is an integral part of a flange portion of sheave 32. Disc 31 is fixedly connected to sheave 32 coaxially therewith.

Braking and load weighing apparatus or unit 40 also includes a support member or casting or mounting means 45 (FIG. 4), which is mounted on platform 27, and which supports brake applying means 41 and load weighing means 42. Brake applying means 41 (FIG. 7) applies a pair of braking loads 46, 47 to disc 31 to permit the transmission of a pair of torque or friction forces from disc 31 to load weighing and sensing means 42. Load weighing and sensing means 42 senses the force of a torque 48 (FIG. 4) in disc 31 and measures the amount of the force of torque 48, which is a function of the amount of live load in car 21, as explained hereafter.

Counterweight 22 has a suitable mass which is designed according to conventional practice. The conditions of live load in car 21 vary from empty car live load, or no live load, to full car live load or maximum live load. In practice, the dead load of counterweight 22 is made substantially equal to the dead load of car 21 plus a balanced car live load, which equals about 42 percent of the maximum or full live load of car 21. With such mass in counterweight 22, when car 21 and disc 31 are in a stationary braked position, the torque 48 on disc 31 due to the live load in car 21 may act in either a clockwise or counterclockwise direction. Such torque 48 on disc 31 acts in a clockwise direction, as viewed in FIG. 1, when the live load in car 21 is in the range between empty car live load and balanced car live load because counterweight 22 is then heavier than car 21. Alternately, such torque 48 on disc 31 acts in a counterclockwise direction, as viewed in FIG. 1, when the live load in car 21 is in the range between balanced car live load and full car live load because car 21 is then heavier than counterweight 22.

Support member or mounting means 45 has a base portion 49 (FIG. 4), which is fixedly connected to platform 27 for mounting support member 45 on platform 27. Support member 45 also has a pair of guide portions or support extensions 50, 51, which support load weighing means 42. Extensions 50, 51 form a groove 52 therebetween, in which a portion of disc 31 is received for applying braking loads 46, 47 to disc surfaces 43, 44. Guide extensions 50, 51 (FIG. 7) have respective guide slots 53, 54, which guide respective portions of brake applying means 41 as explained hereafter. Support member 45 (FIG. 3) also has a cavity 55, which receives a portion of brake applying means 41 as explained hereafter.

Brake applying means 41 (FIG. 7) includes a pair of clamping or actuating arms 56, 57, and includes a pair of brakeshoes or friction members 58, 59, which are respectively actuated by arms 56, 57 for applying braking loads 46, 47 to disc surfaces 43, 44. Friction members 58, 59 and brake arms 56, 57 are supported by support member 45 and are movable relative thereto. Friction members 58, 59 permit disc 31 to transmit a pair of friction or torque forces to load weighing and sensing means 42. The actual sizes of the pair of friction forces are a function of torque 48 of disc 31. The maximum limits to the sizes of the pair of friction forces are a function of the pair of braking loads 46, 47.

Figure 6:
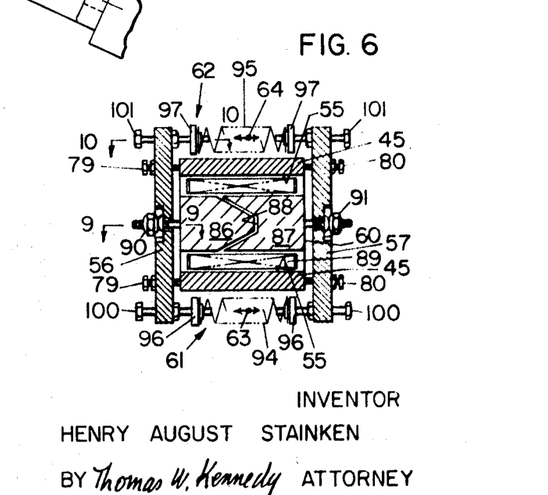
FIG. 6 is a sectional view taken along the line 6—6 of FIG. 3.

Brake applying means 41 (FIG. 6) also includes an electromagnetic tension unit 60, which is connected to arms 56, 57 for actuating arms 56, 57 in order too release braking loads 46, 47 from disc surfaces 43, 44. Brake applying means 41 also includes a pair of compression spring units 61, 62 for actuating arms 56, 57. Spring units 61, 62 exert respective compression forces 63, 64 against arms 56, 57 for applying the braking loads 46, 47 to disc surfaces 43, 44.

Brake arms 56, 57 (FIG. 3) have respective pivot pins 65, 66, which are respectively journaled in support extensions 50, 51. Pins 65, 66 have respective pivot axes 67, 68 about which brake arms 56, 57 are angularly displaceable through slight angles relative to extensions 50, 51.

Figure 8:
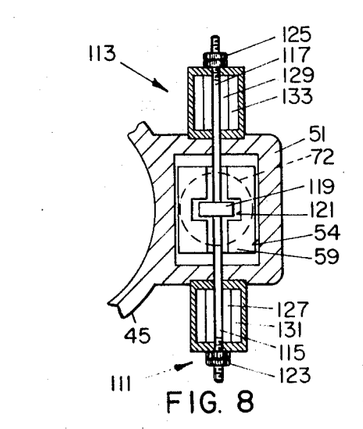
FIG. 8 is a sectional view taken along the line 8—8 of FIG. 7.

Friction members 58, 59 (FIGS. 7, 8) are respectively received in guide slots 53, 54 of extensions 50, 51. Extensions 50, 51 guide friction members 58, 59 and permit slight displacements of both friction members 58, 59 relative to extensions 50, 51 in a direction substantially parallel to each other and parallel to a tangent to disc 31. Friction members 58, 59 have respective recesses 69, 70 of circular profile, and have respective friction pads 71, 72, which are received in said recesses 69, 70. Pads 71, 72, which respectively engage disc surfaces 43, 44, are preferably composed of a high-friction brake lining material, or the like. Pads 71, 72 are removably fitted in recesses 69, 70 for ease of replacement and maintenance thereof. Pads 71, 72 are so mounted in recesses 69, 70, so that any movement of either pad 71 or 72 relative to its respective friction member 58 or 59 is minimized.

Figure 11:
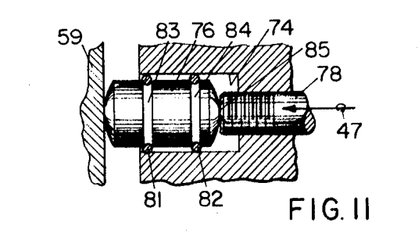
FIG. 11 is a sectional view taken along the line 11—11 of FIG. 7.

Brake arms 56, 57 (FIGS. 7, 11) have respective recesses 73, 74 and have respective bearing pins 75, 76, which are disposed therein for transmitting the braking or bearing loads 46, 47 through respective friction members 58, 59 to disc surfaces 43, 44. Arms 56, 57 also have respective pin adjusting screws 77, 78 for adjusting the position of pins 75, 76 relative to arms 56, 57. Pin adjusting screws 77, 78 permit a relatively fine adjustment of the amount of angular travel of pins 75, 76 and arms 56, 57 relative to disc surfaces 43, 44. Arms 56, 57 (FIG. 6) also have respective arm adjusting screws 79, 80 to permit a relatively rough adjustment of the amount of angular travel of pins 75, 76 and arms 56, 57 relative to disc surfaces 43, 44.

Bearing pin 76 (FIG. 11), which is identical in construction to bearing pin 75, has a pair of annular rings 81, 82 and has a pair of annular grooves 83, 84, which receive rings 81, 82. Rings 81, 82 are preferably composed of a resilient material, such as an elastomeric material, so that pin 76 can slightly tilt relative to its recess 74. In this way, pin 76 can tilt in any direction relative to recess 74 about a bearing point 85 between adjusting screw 78 and pin 76. Thus, pin 76 can rotate in any direction about bearing point 85 so that pin 76 does not exert a transverse restraining force but does exert a bearing force on friction member 59 as friction member 59 is displaced slightly relative to guide extension 51 by the friction load of disc 31.

Bearing pin 76 (FIG. 11) is preferably a cylindrical member which has end faces that preferably have spherically shaped bearing surfaces for ease of tilting of pin 76 about bearing surface point 85. With such construction of bearing pin 76 and rings 81, 82, the amount of transverse restraining force applied to friction member 59 by pin 76 is minimized so that the vertical displacement of friction member 59 is not resisted by pin 76. In addition, the spring force applied to pin 76 by rings 81, 82, when so compressed, is of sufficient amount to return pin 76 to its normal, untilted position in its recess 74 after braking load 47 is removed therefrom.

Figure 9:
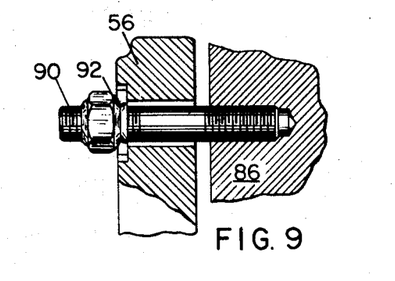
FIG. 9 is a sectional view taken along the line 9—9 of FIG. 6.
Figure 10:
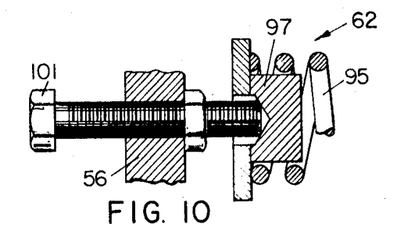
FIG. 10 is a sectional view taken along the line 10—10 of FIG. 6.

Electromagnetic unit 60 (FIG. 6) includes a pair of magnet core members 86, 87 having a gap 88 therebetween, and includes an electrical coil 89 for actuating core members 86, 87. Core members 86, 87 are disposed in cavity 55 of support member 45. Core members 86, 87 (FIGS. 6, 9) have respective connecting studs 90, 91, which are fixedly connected thereto and which extend outwardly therefrom. Studs 90, 91 have respective universal joint connections or spherical bearing washer units 92 (FIG. 9), which are mounted on arms 56, 57. Spherical washer units 92 form connections, which are similar to universal joints, between studs 90, 91 and their connecting arms 56, 57 whereby unwanted bending moments applied by core members 86, 87 to arms 56, 57 are minimized.

Compression spring units 61, 62 respectively include a pair of coil springs 94, 95. Springs 94, 95, which are identical in construction, have respective pairs of spring seats 96, 97 that have respective pairs of adjusting screws 100, 101. Screws 100, 101 are adjustable for adjusting the amount of the respective compression forces 63 and 64 applied to arms 56, 57 by springs 94, 95.

Load weighing means 42 (FIG. 7), which is a torque sensing means, includes a pair of lower sensors 110, 111 for sensing the force of torque 48 in a clockwise direction, as viewed in FIG. 1, and a pair of upper sensors 112, 113 for sensing the force of torque 48 in a counterclockwise direction. Sensors 110, 111, 112, 113 are preferably magnetostrictive transducers, as explained hereafter. It is noted that torque 48 acting in a clockwise direction, as viewed in FIG. 1, occurs during the condition wherein the car load varies from empty car load to balanced car load as explained heretofore. Also, torque 48 acting in a counterclockwise direction, as viewed in FIG. 1, occurs during the condition wherein the car load varies from balanced car load to full car load.

Torque 48 is measured by sensors 110, 111 or 112, 113 after braking loads 46, 47 have been applied and after disc 31 is in a substantially stationary position or static condition, where in any angular displacement of disc 31 about shaft axis 30 is very slight. For example, in one model of embodiment 20, in such static condition, the angular displacement of disc 31 about shaft axis 30 corresponds to a slight vertical movement of each of the friction members 58, 59 relative to support member 45 of about a few thousandths of an inch. Such slight movement of each of the friction members 58, 59 during the static condition thereof is accompanied by a corresponding stress deformation of each of the sensors 110, 111 or 112, 113. Such deformation is caused by the transmitted friction or torque forces from disc 31 through friction members 58, 59 to sensors 110, 111 or 112, 113.

Braking loads 46, 47, which act substantially at right angles to disc surfaces 43, 44, determine the maximum sizes or upper limits of the transmitted torque forces, which are transmitted to sensors 110, 111 or 112, 113 from said disc surfaces 43, 44. It is noted that the torque 48 on disc 31 due to the live load in car 21 is a function of the sum of the transmitted friction or torque forces because the size of said torque 48 substantially equals the product of the sum of said transmitted friction or torque forces times the common radial arm thereof from shaft axis 30. Braking loads 46, 47 are of sufficient magnitude to prevent slippage of disc 31 for the maximum sizes or amounts of the transmitted torque or friction forces. When disc 31 is urged clockwise by torque 48, as viewed in FIG. 1, lower sensors 110, 111 sense the amount of said friction forces; and when disc 31 is urged counterclockwise by torque 48, as viewed in FIG. 1, upper sensors 112, 113 sense the amount of said friction forces. In this way, sensors 110, 111 or 112, 113 can measure the clockwise or counterclockwise torque 48 in disc 31. However, the maximum permissible amount of torque transmitted or the friction or torque forces transmitted without disc slippage depends on the sizes of the braking loads 46, 47.

Lower sensors 110, 111 (FIG. 7) have respective elongate bars 114, 115, and similarly, upper sensors 112, 113 have respective bars 116, 117. Bars 114, 115, 116, 1177 are force transmitting means for transmitting torque forces therethrough from disc 31. Lower and upper bars 114, 116 have an integral key member 118 disposed therebetween, which is fixedly connected to friction member 58. Similarly, lower and upper bars 115, 117 have an integral key member 119 disposed therebetween, which is fixedly connected to friction member 59. In this way, sensor bars 114, 115 or 116, 117 can exert tension loads, which are equal and opposite to the torque forces. Friction members 58, 59 have respective grooves 121 (FIG. 8) which respectively receive key members 118, 119. Key members 118, 119 are snugly fitted in grooves 121 so that relative movement between key members 118, 119 and friction members 58, 59 and backlash are substantially avoided. With such construction, friction members 58, 59 can be disconnected from bars 114, 116 and 115, 117 for ease of maintenance and replacement of friction pads 71, 72. Moreover, with such construction, friction members 58, 59 automatically take up any gaps due to wearing of friction pads 71, 72.

Sensor bars 114, 115, 116, 117, which are similar in construction, respectively have adjustable locknuts 122, 123, 124, 125 threaded on the ends thereof for transmitting tension loads therethrough. For example, locknut 124 transmits the tension load from bar 116. In this way, the tension load applied to bar 116 by friction member 58 is transmitted through bar 116 to extension 50 of support member 45. Thus, downward torque or friction loads, acting normal to braking loads 46, 47, which are applied to friction pads 71, 72 from disc surfaces 43, 44, can be transmitted through upper bars 116, 117 to the support extensions 50, 51. Also, upward torque or friction loads, acting normal to braking loads 46, 47, which are applied to friction pads 71, 72 from disc surfaces 43, 44, can be transmitted through lower bars 114, 115 to the support extensions 50, 51. Bars 114, 115, 116, 117, which are elongate rods of cylindrical cross section, are preferably composed of a nickel metal, such as a nickel alloy, or the like.

Figure 12:
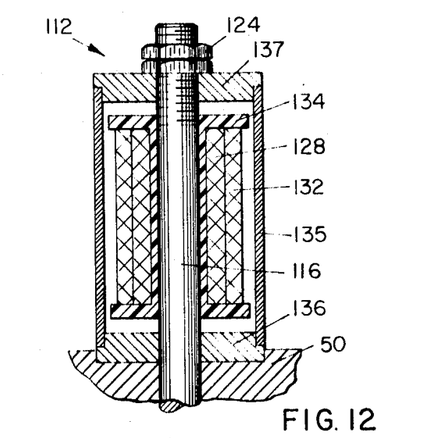
FIG. 12 is an enlarged portion of FIG. 7.

Sensors 110, 111, 112, 113 (FIGS. 7, 12), which are magnetostrictive transducers, have respective inner primary windings 126, 127, 128, 129 and respective outer secondary windings 130, 131, 132, 133, which are force sensing means for measuring the magnitudes of the torque forces. Sensor 112, which is similar inn construction to sensors 110, 111, 113, has a spool 134 that surrounds bar 116. Spool 134 supports primary and secondary windings 128, 132. Spool 134 and windings 128, 132 are surrounded by a cylindrical shell 135 of magnetic material, the open ends of which re closed by end caps 136, 137 also of magnetic material. End caps 136, 137 tightly engage shell 135 and bar 116 so that there is formed a transformer with a closed magnetic circuit having bar 116 as a part of its core.

The magnetostrictive properties of certain materials, such as nickel, are well known. If a transformer is constructed using a nickel bar as a core and if the primary winding be excited with alternating current, the output voltage of the secondary winding varies with the stress in the bar. A variation of stress in tension provides a substantially linear variation in output voltage. The primary and secondary windings together act as a stress measuring unit for measuring the stress in the nickel bar. As the tension load in the nickel bar increases, the output voltage from the secondary winding decreases. The tension loads or torque forces in sensor bars 114, 115 or 116, 117 are measured in this way.

Figure 14:
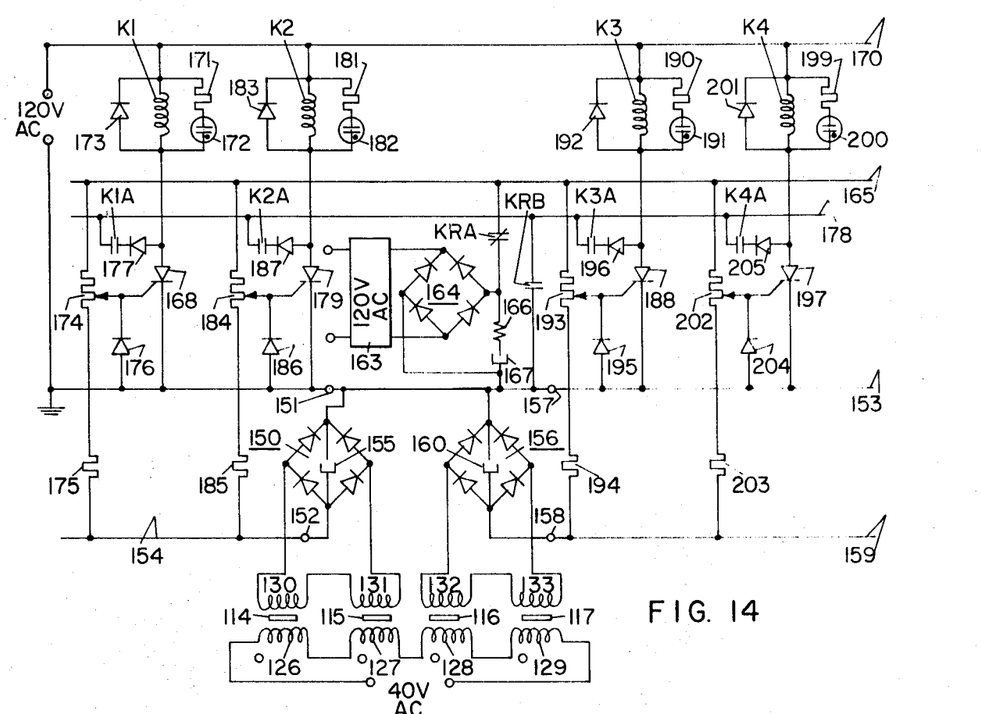
FIG. 14 is a schematic diagram of the electrical circuit.

As shown in FIG. 14, the primary windings 126, 127, 128, 129 of the four transformers or sensors 110, 111, 112, 113 are connected in series to a source of alternating current. Secondary windings 130, 131 of lower transformers 110, 111, which cooperate with lower bars 114, 115, are connected inn series to the input of a full wave bridge rectifier 150. The output of rectifier 150 is connected to output terminals 151, 152, which are respectively connected to a ground conductor 153 and a signal conductor 154. Rectifier 150 also has a capacitor 155 to smooth out high-frequency variations in magnitude.

Secondary windings 132, 133 of upper transformers 112, 113 which cooperate with upper bars 116, 117 are similarly connected in series to the input of a full wave bridge rectifier 156. The output of rectifier 156 is connected to output terminals 157, 158, which are respectively connected to the ground conductor 153 and to a signal conductor 159. Rectifier 156 also has a capacitor 160.

When a pair of the primary windings 126, 127 or 128, 129 is excited with alternating current, an alternating voltage is induced in the pair of secondary windings 130, 131 or 132, 133 corresponding thereto. As the live load in car 21 is increased from zero or empty car load EC to balanced car load BL, the induced alternating voltage in the pair of lower secondary windings 130, 131 increases approximately linearly. Also, the unidirectional voltage at lower output terminals 151, 152 increases approximately linearly. As the live load in car 21 is further increased from balanced car load BL to full car load FL, the induced alternating voltage in the pair of upper secondary windings 132, 133 decreases approximately linearly, and the unidirectional voltage at upper output terminals 157, 158 decreases approximately linearly. In general, the voltage at output terminals 151, 152 or 157, 158 decreases as the tension in the corresponding sensor bars 114, 115 or 116, 117 increases. Output terminals 151, 152 form the output terminals of a first analog signal indicator; and output terminals 157, 158 form the output terminals of a second analog signal indicator. Terminals 151, 152, 157, 158 form the input terminals of a common analog to digital signal indicating device as explained hereafter.

Figure 13:
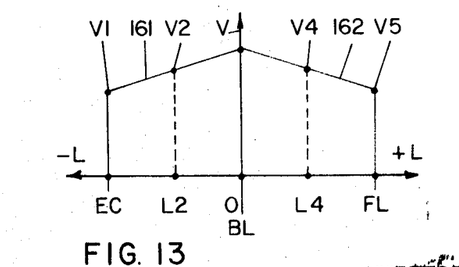

As shown in FIG. 13, the variation of unidirectional voltage V at lower output terminals 151, 152 versus live load L in car 21 between balanced live load BL and empty car load EC is shown schematically by left-hand curve 161. The second variation of unidirectional voltage at upper output terminals 157, 158 versus live load in car 21 between balanced live load BL and the series live load FL is shown schematically by right-hand curve 162 of FIG. high-frequency At balanced live load BL, a positive voltage is shown in FIG. 13 because of the use of a bias voltage, as explained hereafter.

Curve 161 shows that lower sensors 110, 111 sense the voltage variation for the variation of tension load in lower sensor bars 114, 115 corresponding to the load weighing variation of empty car load EL to balanced car load BL. Curve 162 shows that upper sensors 112, 113 sense the voltage variation for the variation of tension load in upper sensor bars 116, 117 corresponding to the load weighing variation of balanced car load BL to full car load FL. Curve 161 corresponds to clockwise torque in disc 31, as viewed in FIG. 1, and curve 162 corresponds to counterclockwise torque in disc 31, as viewed in FIG. 1.

In some elevator control systems, the outputs from lower output terminals 151, 152 and upper output terminals 157, 158 which are analog outputs can be used directly to control an elevator system. In embodiment 20, a step control is utilized instead of an analog control. The remainder of the circuit of FIG. 14 senses various predetermined levels of the voltage at lower terminals 151, 152 and upper terminals 157, 158. Thus, this remaining portion of the circuit may be regarded as an analog to digital converter and signal indicating device. The signals generated are in the form of discrete changes in voltage and current and are utilized to operate elevator control relays and indicator lamps, as explained hereafter.

A bias transformer 163 is connected to the input of a bias rectifier 164, which is a full wave bridge rectifier. The output of bias rectifier 164 is connected to the ground conductor 153 and is connected to a bias conductor 165 through the normally closed contactor KRA, the purpose of which will be described hereafter. Shunted across the output of bias rectifier 164 is the series combination of a resistor 166 and a capacitor 167 to smooth out high-frequency variations in magnitude therein.

A first silicon controlled rectifier 168 has its cathode connected to ground conductor 153 and its anode connected through the operating coil of a first load weighing relay K1 and a supply conductor 170 to a terminal of a source of alternating current, the other terminal of which is grounded. Shunted across load weighing relay K1 is the series combination of a resistor 171 and a neon lamp 172. Also shunted across load weighing relay K1 is a diode 173, the anode of which is connected to a terminal between load weighing relay K1 and silicon controlled rectifier 168 and the cathode of which is connected to supply conductor 170.

A voltage divider including a first potentiometer 174 and a first resistor 175 are serially connected in that order between the bias conductor 165 and the signal conductor 154. The wiper arm of potentiometer 174 is connected to the gate electrode of the silicon controlled rectifier 168. A diode 176 is connected at its cathode to the gate electrode of the silicon controlled rectifier 168 and is connected at its anode to the ground conductor 153. A diode 177 has its anode connected to the anode of the controlled rectifier 168 and its cathode connected through a normally open, self-holding contactor K1A (operated by relay winding K1) and through a holding conductor 178 and through normally open contactor KRB in that order, for a purpose which will be explained hereafter, to the ground conductor 153. In operation, first rectifier 168 is preferably actuated at the voltage V1, which substantially corresponds to empty car live load EC, and which is shown schematically on left curve 161 of FIG. 13.

A second silicon controlled rectifier 179 and a second load weighing relay K2 are connected to the ground conductor 153, the supply conductor 170, bias conductor 165 and signal conductor 154 by circuitry similar to that described for first controlled rectifier 168 and first relay K1. Second relay K2 has a corresponding resistor 181, neon lamp 182 and diode 183 connected thereto. The gate circuitry of second rectifier 179 also includes a corresponding potentiometer 184, resistor 185 and diode 186. The anode circuitry of rectifier 179 also includes a corresponding contactor K2A and diode 187. In operation, second rectifier 179 is preferably actuated at the voltage V2 substantially corresponding to live load L2 as shown schematically on curve 161 of FIG. 13.

A third silicon controlled rectifier 188 and a third load weighing relay K3 are arranged similar to first rectifier 168 and first relay K1. Third relay K3 has a corresponding resistor 190, neon lamp 191 and diode 192. The gate circuitry of third rectifier 188 has a corresponding potentiometer 193, resistor 194 and diode 195. The anode circuitry of third rectifier 188 has a corresponding contactor K3A and diode 196. In operation, third rectifier 188 is preferably actuated at a voltage V4 substantially corresponding to live load L4, as shown schematically on curve 162 of FIG 13.

A fourth silicon controlled rectifier 197 and a fourth load weighing relay K4 similarly have a corresponding resistor 199, neon lamp 200 and diode 201 connected thereto. The gate circuitry of fourth rectifier 197 also includes a potentiometer 202, a resistor 203 and a diode 204. The anode circuitry of rectifier 197 also has a contactor K4A and a diode 205. In operation, fourth rectifier 197 is preferably actuated at a voltage V5 substantially corresponding to full car live load FL, as shown schematically by curve 162 of FIG. 13. With this arrangement, many additional similar circuits may also be added, as desired. The above four circuits, which respectively include silicon controlled rectifiers 168, 179, 188, 197, are sufficient in order to illustrate and describe the arrangement and operation of the load weighing relays K1, K2, K3, K4 of the elevator control system of embodiment 20.

In operation, first potentiometer 174 is adjusted and first resistor 175 is selected so that the potential at the wiper of the potentiometer 174 is such that it causes first silicon controlled rectifier 168 to become conductive when a predetermined live load is in elevator car 21, such as empty car live load EC. Current flows in a loop from bias conductor 165 through first potentiometer 174, first resistor 175, signal conductor 154, lower bridge rectifier 150, ground conductor 153, bias rectifier 164, and back to bias conductor 165. When first silicon controlled rectifier 168 becomes conductive, current flows therethrough during each half cycle of the alternating current source and the first load weighing relay K1 is operated. First diode 173 smooths the pulsating direct current and prevents first load weighing relay K1 from chattering. The voltage drop across first load weighing relay K1 illuminates the first lamp 172.

The remaining second, third and fourth potentiometers 184, 193, 202 are adjusted and their respective resistors 185, 194, 203 are selected so as to cause second, third and fourth silicon controlled rectifiers 179, 188, 197 to become conductive for successively larger predetermined live loads in the elevator car 21, such as for live load L2, live load L4, and full car live load FL. In this way, second, third and fourth load weighing relays K2, K3, K4 are energized and their lamps 182, 191, 200 are illuminated in that order when the live load in elevator car 21 is so increased.

It is preferable if the circuit parameters are adjusted and selected so that the potential at the wiper of first potentiometer 174 is just sufficient to cause first silicon controlled rectifier 168 to be conductive when the car 21 is empty and has zero live load EC. In this way, first load weighing relay K1 is energized and first lamp 172 is illuminated at all times. Thus, a serviceman can easily check the condition of the system because only the first lamp 172 is illuminated when the elevator car 21 is empty.

Figure 15:
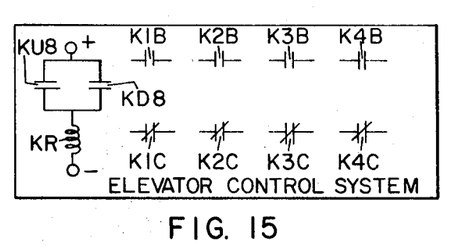
FIG. 15 is a schematic view of a control system.

FIG. 15 shows schematically a few elements of an elevator control system including, for illustrative purposes, both normally open contacts K1B, K2B, K3B, K4B, and normally closed contacts K1C, K2C, K3C, K4C operated by the relays K1, K2, K3, K4. These contacts may be connected in a well-known manner to control the elevator system in accordance with the live load in car 21. For example, these contacts can be used to control the energization of hoist motor 24, or to dispatch a full car, or to bypass hall calls when the car is full. Also shown is the operation winding of a relay KR which is energized when and only when the elevator car is running. The winding KR may be connected in various ways, one satisfactory arrangement being shown in FIG. 15 wherein the winding KR is energized when and only when one of the auxiliary contacts KU8 or KD8 of the main up and down relays KU or KD (not shown) are closed.

As shown in FIG. 14, the previously mentioned normally closed contactor KRA, which is operated by relay KR, is inserted in the line between the output of the bias rectifier 164 and bias conductor 165. In addition, the normally open contactor KRB is connected between the holding conductor 178 and the ground conductor 153. When the car 21 is at a landing, contactor KRA is closed, and contactor KRB is open, and the circuit operates as previously explained, with the live load in car 21 determining which of the load weighing relays K1, K2, K3, K4 are energized.

For example, with the brake applied at a landing, if the live load in car 21 is sufficient to render the first and second controlled rectifiers 168, 179 conductive, but is insufficient to render the third and fourth controlled rectifiers 188, 197 conductive, then only the relays K1 and K2 are energized thereby closing contactors K1A and K2A. Closure of these contactors has no effect at this time since the contactor KRB is open. Just before the car moves, the relay winding KR is energized and the contactor KRB closes completing a circuit, independent of the first controlled rectifier 168, for the relay K1 through the diode 177, contactor K1A, and the contactor KRB to ground, and completing a similar circuit for the relay K2. The relays K3 and K4 remain deenergized since the contactors K3A and K4A are open. At the same time, the contactor KRA opens removing the positive voltage on bias conductor 165. Current flows from ground conductor 153 through diode 176, potentiometer 174 and resistor 175 to the negative signal conductor 154 biasing the gate electrode of the first controlled rectifier 168 slightly negative (by the amount of the voltage drop in the diode 176) thereby rendering the first controlled rectifier 168 nonconductive.

Similarly, all of the controlled rectifiers 179, 188, 197 are rendered nonconductive. But the relays K1 and K2 remain energized while the relays K3 and K4 remain deenergized. Thus, the circuit stores the signals and "remembers" the load in the car as it was just before it started to move so that the elevator system can be controlled accordingly. When the car next stops, the relay KR is deenergized, the contactor KRB opens breaking the holding circuits for the relays K1 and K2, and the contactor KRA closes reestablishing the voltage on the bias conductor 165 thereby again allowing the live load in the car to determine which of the controlled rectifiers are rendered conductive.

In summary, the load weighing arrangement according to the invention provides the following advantages. The measurement is dependent of car position and of the tension in the compensating ropes. The load weighing apparatus is located in the machine room for ease of servicing. No conductors between the car and machine room are required for the load weighing apparatus. The system responds quickly to changes in live load in the car. The load weighing apparatus is adequately sensitive to detect the load due to a single person in the car. The hoisting machine bedplate can be fixedly connected to the floor beams of the machine room so that vibration in the hoisting machine and its bedplate is minimized. In addition, the hoisting machine bedplate can be fixedly mounted to the machine room platform structure so as to resist severe transverse loads, such as earthquake loads, or the like, without the need for special mounting details. Also, the secondary sheave can be fastened to the machine room platform structure.

Figure 16:
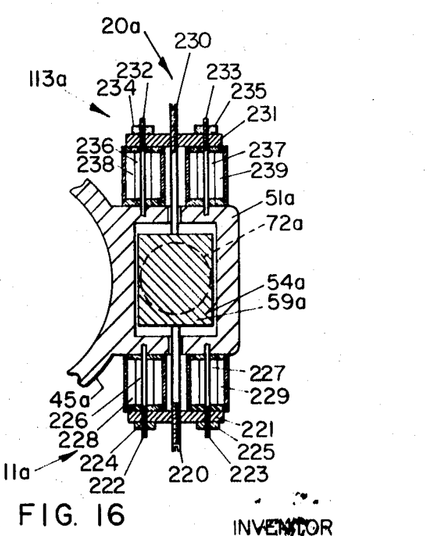
FIG. 16 is a portion of a second embodiment of an elevator system having a load weighing apparatus according to the invention; and to the 17 is a portion of a third embodiment of an elevator system having a load weighing apparatus according to the invention.

A second embodiment 20a, according to the invention, can be provided, as shown in part in FIG. 16, wherein like parts have like numerals but with a subscript "a" added thereto. FIG. 16 of embodiment 20a, which corresponds to FIG. 8 of embodiment 20, shows the modified portions of embodiment 20a. Embodiment 20a has a friction member 59a, which supports a friction pad 72a. Friction member or brakeshoe 59a is disposed in guide slot 54a of guide extension 51a of support member 45a. Co acting with friction member 59a is a load weighing, lower sensor 111a which is mounted on extension 51a. The other lower sensor (not shown) is mounted on the opposite extension (not shown). Also coating with member 59a is an upper sensor 113a, which is mounted on extension 51a. There is another upper sensor (not shown) which is mounted on the opposite extension (not shown).

Lower sensor 111a has an elongate compression strut 220, the end of which bears against the lower end face of friction member 59a. Lower sensor 111a also has a load transmitting plate 221, which is fixedly connected by a threaded connection to the other end of compression strut 220. Lower sensor 111a also includes a pair of elongate lower tension bars 222, 223, one end of each being threaded into and fixedly connected to extension 51a. The other end of each of the tension bars 222, 223 extends through a hole in plate 221. Bars 222, 223 have respective bearing nuts 224, 225 for bearing against plate 221. With this construction, downward movement of friction member 59a causes tension in lower tension bars 222, 223. Lower tension bars 222, 223 also cooperate with respective primary windings 226, 227 and secondary windings 228, 229 for measuring the tension loads therein.

Upper sensor 113a, which is identical in construction to lower sensor 111a, similarly includes a compression strut 230, a plate 231, and a pair of upper tension bars 232, 233 which have respective bearing nuts 234, 235. Upward movement of friction member 59a causes tension in upper tension bars 232, 233. Upper bars 232, 233 similarly have respective primary windings 236, 237 and secondary windings 238, 239.

Sensors 111a and 113a of embodiment 20a have a circuit diagram, which is similar to that of sensors 111 and 113 of embodiment 20 of FIG. 14, except sensors 111a, 113a are interconnected in an opposite order or arrangement. Upward movement of friction member 59a causes tension in upper tension bars 232, 233 instead of in lower tension bars 222, 223 for the condition of clockwise torque, as viewed in FIG. 1, which condition corresponds to the range between empty car load EL to balanced car load BL. Because of this, it is necessary to reverse the arrangement of sensors 111a, 113a in their circuit. That is, upper and lower sensors 113a, 111a of embodiment 20a are connected respectively in place of the lower and upper sensors 111, 113 of embodiment 20 of FIG. 14. For example, windings 236, 237 of sensor 113a replace winding 127 of sensor 111. Except for such differences in the arrangement of the circuit, the circuit diagram of second embodiment 20a and first embodiment 20 are substantially alike.

With such construction of second embodiment 20a, any slight differential movement of friction member 59a relative to tension bars 222, 223 or 232, 233 is minimized. Thus, any slight errors in load weighing measurements caused by a slight differential movement of friction member 59a relative to tension bars 222, 223 or 232 233 is minimized. Moreover, backlash in friction member 59a is substantially eliminated.

Figure 17:
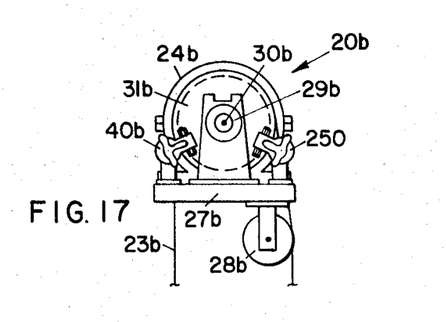

A third embodiment 20b, according to the invention, can be provided as shown schematically in FIG. 17, wherein like parts have like numerals, but with a subscript "b" added thereto. FIG. 17 of third embodiment 20b corresponds to FIG. 1 of first embodiment 20. Third embodiment 20b, which is an elevator system, includes a plurality of hoist ropes 23b for supporting the car (not shown) and counterweight (not shown). Embodiment 20b also includes a hoist motor 24 b, and includes a platform structure 27b for supporting hoist motor 24 b. Platform structure 27b has a secondary sheave 28b which supports hoist ropes 24b. Hoist motor 24b also has a drive shaft 29b, which has a shaft axis 30b. Shaft 29b has a brake disc 31b fixedly connected thereto. Hoist motor 24b also has a pair of braking and load weighing units 40b, 250.

Units 40b, 250 of embodiment 20b are substantially identical to each other in construction. Units 40b, 250 are each substantially identical in construction to braking and load weighing unit 40 of embodiment 20. Units 40b and 250 are actuated simultaneously to apply respective coacting braking forces to disc 31b. Units 40b and 250 of embodiment 20b have a common circuit arrangement or diagram (not shown), which is substantially identical in construction to the circuit diagram of unit 40 of embodiment 20.

With such construction of embodiment 20b, each of the units 40b and 250 is a substantially identical modular unit forming a common braking and load weighing assembly for an elevator system. In this way, hoisting motor 24b can be comprised of a plurality of such identical braking and load weighing modular units. Thus, a plurality of standard modular units can be used to construct a plurality of different braking and load weighing assemblies for a plurality of different hoisting motors, which are suitable for different elevator systems, for ease of manufacture thereof.

Preferred embodiments have been described in detail, and many other modifications thereto may occur to those skilled in the art. It is intended that the particular embodiments which have been described in detail be typical of all such modified embodiments.

What is claimed is:

1. Load weighing apparatus comprising, an elevator car having a variable load, a counterweight for said elevator car, a hoist rope connected to said elevator car and to said counterweight, a hoist motor for said hoist rope, a support structure supporting said hoist motor, said hoist motor having a drive shaft for driving said hoist rope and for resisting the torque applied thereto by said hoist rope, brake applying means cooperating with said drive shaft and operative to resist the torque applied to said drive shaft, and torque sensing means connected to said brake applying means and to said support structure and operative to sense and to measure said shaft torque for measuring the elevator car variable load.

2. Load weighing apparatus as claimed in claim 1, wherein said brake applying means includes brakeshoe means operative to resist the force of said shaft torque, and wherein said brake applying means includes shoe actuating means operative to actuate said brakeshoe means, and wherein said torque sensing means includes force transmitting means for supporting said brakeshoe means and for transmitting said torque force to said support structure, and wherein said torque sensing means includes force sensing means coacting with said force transmitting means for measuring said torque force transmitted through said force transmitting means for supporting said brake applying means and said torque sensing means.

3. Load weighing apparatus as claimed in claim 2, wherein said drive shaft includes an annular brake member fixedly connnected to said shaft coaxially therewith along a shaft axis, and wherein said brakeshoe means includes first and second brakeshoes disposed on opposite sides of said annular brake member, and wherein said shoe actuating means includes first and second arms for respectively actuating said first and second brakeshoes, and wherein said force transmitting means includes first and second upper sensor tension bars respectively coacting with said first and second brakeshoes, and wherein said force transmitting means includes first and second lower sensor tension bars respectively coacting with said first and second brakeshoes, and wherein said force sensing means includes a plurality of transducers respectively cooperating with said sensor bars.

4. Load weighing apparatus as claimed in claim 3, wherein said annular brake member is a brake disc, and wherein said mounting means has first and second guide extensions supporting said sensor bars, said guide extensions having a groove therebetween for receiving said disc, and said guide extensions having respective guide slots facing said disc, said guide slots respectively receiving said first and second brakeshoes.

5. Load weighing apparatus as claimed in claim 4, wherein each of said plurality of transducers includes a transformer primary winding and a transformer secondary winding disposed concentric about its associated sensor bar, and wherein said sensor bars are nickel bars.

6. Load weighing apparatus as claimed in claim 4, wherein said force sensing means includes a first analog signal indicating device connected to said transducers for measuring said disc torque in one direction of rotation and for providing a first analog signal output, and includes a second analog signal indicating devices connected to said transducers for measuring said disc torque in an opposite direction of rotation and for providing a second analog signal output.

7. Load weighing apparatus as claimed in claim 6, wherein said force sensing means includes a common analog to digital signal indicating device connected to said first and second analog signal indicating devices for providing a common digital signal output at selected spaced variable load intervals between empty elevator car live load and full elevator car live load for operating a control means for controlling the elevator car.

8. Load weighing apparatus as claimed in claim 4, wherein said brake applying means includes an electromagnetic unit supported by said mounting means for urging said brakeshoes away from said brake disc, and includes spring means connected to said brake arms for urging said brakeshoes into engagement with said brake disc.

9. Load weighing apparatus as claimed in claim 8, wherein said electromagnetic unit has a pair of core members received in a cavity in said mounting means, and wherein said electromagnetic unit has coil means for displacing said core members relative to said mounting means, said core members having respective connections to said brake arms for rotary displacement of said brake arms relative to said mounting means, each of said connections of said core members to said brake arms having spherical bearing means for providing a rotatable joint connection between the core member and its brake arm to minimize the transmittal of bending moment therebetween.

10. Load weighing apparatus as claimed in claim 9, wherein said spring means includes a pair of spring units, each said spring unit having a pair of spring seats and a coil spring disposed between said spring seats and adjusting means for adjusting the compression force of said coil spring.

11. Load weighing apparatus as claimed in claim 4, wherein said force transmitting means also includes first and second upper compression struts having respective end portions bearing against said first and second brakeshoes for transmitting the torque forces to the upper tension bars and also includes first and second lower compression struts having respective end portions bearing against said first and second brakeshoes for transmitting the torque forces to the lower tension bars.

12. Load weighing apparatus as claimed in claim 4, wherein said brake arms have respective pivot pins mounted on said pair of guide extensions for rotary displacement of said arms relative thereto and for movement of said brakeshoes toward and away from said brake disc, and wherein said brakeshoes have respective recesses which receive respective friction pads therein for engaging said brake disc.

13. Load weighing apparatus as claimed in claim 4, wherein said first and second brake arms have first and second bearing members respectively bearing against said first and second brakeshoes for transmitting respective first and second bearing loads to said brakeshoes, each said bearing member having a spherical bearing surface at one end thereof for engaging its brakeshoe and having a pivot axis at the other end thereof about which said bearing member can rotate relative to its arm.

14. Load weighing apparatus as claimed in claim 13, wherein each said brake arm has a recess for receiving its bearing member and has an adjusting means for adjusting the position of said bearing member relative to its arm, and wherein each said bearing member has a pair of annular grooves and has a pair of annular resilient rings received in said grooves for resiliently supporting said bearing member and for pivoting of said bearing member about its pivot axis.

15. Load weighing apparatus as claimed in claim 4, wherein said car and counterweight have a plurality of compensating ropes connected to the undersides thereof, and have a tensioning sheave unit connected to said compensating ropes for applying a tension force thereto, and wherein said car and counterweight are disposed below and suspended from said hoist motor.

16. Load weighing apparatus as claimed in claim 4, wherein said drive shaft has a drive sheave fixedly connected thereto coaxially therewith for guiding and driving said hoist rope, and wherein said drive sheave has an integral flange portion coaxial therewith, said brake disc being fixedly connected to said sheave flange portion coaxial therewith for support therefrom.

17. Load weighing apparatus as claimed in claim 4, wherein said brake applying means and said torque sensing means are formed in a plurality of modular units of substantially identical construction, said modular units being peripherally spaced around said brake disc for cooperation therewith, each said modular unit having individual brakeshoe means and shoe actuating means and having individual torque force transmitting means and torque force sensing means and having individual mounting means, said modular units being arranged so that all of said torque force sensing means of said modular units can be connected to a common signal indicating device and whereby all of said shoe actuating means of said modular units can be actuated by a common control device.

18. Load weighing apparatus comprising, an elevator car having a variable load, a counterweight for said elevator car, a hoist rope connected to said elevator car and to said counterweight, a hoist motor for said hoist rope, a support structure supporting said hoist motor, said hoist motor having a drive shaft for driving said hoist rope and for resisting the torque applied thereto by said hoist rope, brake applying means cooperating with said drive shaft and operative to resist the torque applied to said drive shaft, and a load sensing mechanism for measuring the amount of said elevator car variable load, characterized in that said load sensing mechanism has a torque sensing portion which is arranged for sensing said shaft torque and which is connected to said brake applying means for means support of said brake applying means and which is connected to said support structure for transmitting the force of the shaft torque to the support structure and which is operative to measure the shaft torque force transmitted therethrough for measuring the elevator car variable load.

19. Load weighing apparatus comprising, an elevator car having a variable load, a hoist rope for supporting said elevator car, a hoist motor having a drive shaft for supporting said hoist rope and for resisting the torque applied thereto by said hoist rope, a support structure for supporting said hoist motor, brake applying means cooperatbng with said drive shaft for resisting said shaft torque, and torque sensing means connected to said brakeshoe means and to said support structure and adapted to sense and to measure said shaft torque for measuring said elevator car variable load.

20. Load weighing apparatus as claimed in claim 19, wherein said elevator car has a counterweight, and wherein said drive shaft has a brake disc, and wherein said brake applying means includes first and second brakeshoes cooperating with said brake disc and respectively having first and second actuating arms, and wherein said torque sensing means includes first and second upper tension bars and includes first and second lower tension bars respectively cooperating with said first and second brakeshoes, and wherein said brake applying means includes first and second guide extensions having a groove therebetween for receiving said brake disc, said extensions having respective guide slots for respectively guiding said brakeshoes, and wherein said upper tension bars respectively have first and second upper primary and secondary coils associated therewith and said lower tension bars respectively have first and second lower primary and secondary coils associated therewith, and wherein said lower secondary coils are connected in series to a full wave bridge rectifier having a first pair of output terminals for providing a voltage which varies with elevator car live load from empty car live load to balanced car live load, and wherein said upper secondary coils are connected in series to a full wave bridge rectifier having a second pair of output terminals for providing a voltage which varies with elevator car live load from balanced car live load to full car live load, and including a common analog to digital control device connected to said first and second pairs of output terminals for operating a control means for controlling said elevator car.